United States Patent
Maeckel et al.

(10) Patent No.: US 6,662,123 B2
(45) Date of Patent: Dec. 9, 2003

(54) METHOD AND APPARATUS FOR IDENTIFICATION OF AN EXTERNAL POWER SUPPLY IN A MOTOR VEHICLE

(75) Inventors: Rainer Maeckel, Koenigswinter (DE); Marcus Kneifel, Schwieberdingen (DE)

(73) Assignees: DaimlerChrysler AG, Stuttgart (DE); Robert Bosch GmbH, Stuttgart (DE)

( * ) Notice: Subject to any disclaimer, the term of this patent is extended or adjusted under 35 U.S.C. 154(b) by 198 days.

(21) Appl. No.: 09/801,832

(22) Filed: Mar. 9, 2001

(65) Prior Publication Data

US 2001/0035757 A1 Nov. 1, 2001

(30) Foreign Application Priority Data

Mar. 9, 2000 (DE) .......................................... 100 11 404

(51) Int. Cl.7 ............................. B60L 3/00; G01R 19/00
(52) U.S. Cl. ........................ 702/60; 702/64; 307/10.1; 701/29
(58) Field of Search ..................... 702/63, 64; 324/426, 324/430; 701/29, 34, 35, 36; 307/10.3, 9.1, 10.7, 10.1; 429/90

(56) References Cited

U.S. PATENT DOCUMENTS

| | | | | |
|---|---|---|---|---|
| 4,258,421 A | * | 3/1981 | Juhasz et al. | 364/424 |
| 5,884,202 A | * | 3/1999 | Arjomand | 701/29 |
| 5,939,797 A | * | 8/1999 | Konno et al. | 307/10.3 |
| 5,965,954 A | * | 10/1999 | Johnson et al. | 307/10.3 |
| 6,130,614 A | * | 10/2000 | Miller et al. | 340/573.4 |
| 6,281,600 B1 | * | 8/2001 | Hough et al. | 307/10.7 |
| 6,424,157 B1 | * | 7/2002 | Gollomp et al. | 324/430 |

FOREIGN PATENT DOCUMENTS

| | | |
|---|---|---|
| DE | 43 41 826 A1 | 12/1993 |
| DE | 195 17 709 C1 | 5/1995 |
| DE | 196 49 392 C2 | 11/1996 |
| DE | 298 06 441 U1 | 4/1998 |

* cited by examiner

Primary Examiner—Marc S. Hoff
Assistant Examiner—Paul L. Kim
(74) Attorney, Agent, or Firm—Crowell & Moring LLP (57) ABSTRACT

A device for identification of an external start is fitted in a vehicle which has an electrical on-board power supply system (14) fed with an on-board power supply system voltage of about 12.5 V via a vehicle battery (10). A negative pole (11) of the battery (10) is connected to a vehicle earth (15). A monitoring unit (13) is arranged between a positive pole (12) of the battery (10) and the on-board power supply system (14). A conventional voltage sensor (20) for detection of the on-board power supply system voltage, a similarly conventional current sensor (21) for detection of the current flowing out of the battery, and a conventional temperature sensor (22) for detection of the operating temperature of the battery (10) are provided in the monitoring unit (13). The main measurement variable is the on-board power supply system voltage; the battery current and the battery temperature represent auxiliary measurement variables in a monitoring algorithm. Furthermore, the monitoring unit (13) contains a microcontroller (23), which can identify a change in the on-board power supply system load via a CAN bus (25). As is indicated by the dashed line (26), the on-board power supply system load can also be detected directly via a controllable switch (24).

26 Claims, 6 Drawing Sheets

METHOD AND APPARATUS FOR IDENTIFICATION OF AN EXTERNAL POWER SUPPLY IN A MOTOR VEHICLE

BACKGROUND AND SUMMARY OF THE INVENTION

This application claims the priority of German patent document 100 11 404.0, filed Mar. 9, 2000, the disclosure of which is expressly incorporated by reference herein.

The invention relates to a device for identification of an external power supply in a vehicle, and particularly for identifying external starting of a motor vehicle which has an electrical on-board power supply system with a battery for providing an on-board power supply system voltage. In addition, the invention relates to a method for operation of such a device.

Safety-relevant functions in vehicles, such as for example the very recently developed electric brake, are increasingly being separately electrically powered. In order to assure the functionality of such components at all times, they must receive an uninterrupted supply of electrical power. For this purpose, in vehicles it is known to provide two energy sources, namely a battery and a generator.

Since the life of a conventional lead-acid battery is generally shorter than the life of the vehicle, situations regularly arise in which only one of the two energy sources can still operate. In most cases, the generator will have a longer life than the battery in this arrangement.

One method for monitoring the serviceability of a battery by means of its battery voltage is disclosed in German patent document DE 195 17 709. The result of the monitoring and the data determined in the process are in this case used, in particular, to decide whether a machine which is connected to the battery will or will not be allowed to operate further.

If the generator is damaged or overloaded when the battery is discharged or defective, the supply to the loads is then no longer ensured and the vehicle can enter a safety-critical state. The generator can be overloaded when more loads are connected than it can nominally supply. For this reason, emergency measures must be taken which, firstly, warn the driver and, secondly, also keep the on-board power supply system in an operationally safe state for as long as possible. The latter can be achieved by retaining only a few important loads in a switched on or connected state.

Furthermore, when the battery is discharged or defective, the vehicle can no longer be started. Thus, starting capability may be regarded as a criterion for the state of the battery energy source. However, in situations such as this, a second vehicle is often used as a starting aid, simulating, so to speak, an intact battery. In this situation, the safety measures mentioned above are not carried out and the warning or stabilization measures do not come into play. For this reason, external starting must be identified.

All that is known in this context from German patent document DE 196 49 392 C2 is to provide a connecting cable for voltage maintenance to be supplied by an external power source having an electronic circuit, which checks that the cable has been connected correctly. In German patent document DE 298 06 441, a warning lamp is provided to indicate that an additional or external energy storage unit has been connected to the vehicle on-board power supply system.

One object of the invention is thus to provide a method and apparatus of the type described initially, which can detect the connection of an external power supply and the performance of external starting, as reliably as possible.

Another object of the invention is to provide such a device and a corresponding method, which can be produced easily and cost-effectively.

These and other objects and advantages are achieved by the method and apparatus according to the invention, in which a monitoring unit is arranged between the battery and the on-board power supply system, and includes a sensor for detection or monitoring of the on-board power supply system voltage, or interacts with such a sensor. The invention is based, in particular, on the proposition that a change in the on-board power supply system voltage and/or in the battery parameters occurs when electrical contact is made between an external battery and a vehicle battery. According to the invention, this change is detected and is evaluated as a function of various parameters relating to external starting. In contrast to the abovementioned prior art, the on-board power supply system voltage is used, in particular, rather than the battery voltage, as the output variable for assessment.

In addition, it is possible to provide the monitoring unit with a sensor for detection of the electric current flowing out of the battery and/or the electric current flowing into the on-board power supply system, or to interact with such a sensor. Together with the detected on-board power supply system voltage, this also allows changes in the on-board power supply system load to be recognized and, advantageously, to be taken into account in the evaluation.

It is also possible to provide the monitoring unit with a sensor for detecting the operating temperature of the battery, or to interact with such a sensor. In principle, the connection of two batteries electrically represents a parallel circuit, as a result of which the total internal resistance of the batteries is reduced. The internal resistance can in this case be measured by a current and voltage measurement using the said sensors. The reduced internal resistance also results in an increase in the current flowing through the battery, which is also associated with a measurable increase in the battery temperature.

This evaluation process can be automated by providing the monitoring unit with a computer unit, in particular a microcontroller, for determination of changes in the electrical on-board power supply system variables.

Any change in the on-board power supply system load can advantageously be recognized by a controllable switch which interacts with the microcontroller, or alternatively by means of vehicle data which are provided via a vehicle CAN bus and are transmitted to the microcontroller.

A further embodiment envisages a timer for detection of a time duration (particularly a minimum duration) of any drop in voltage which may occur in the on-board power supply system voltage. Together with recognition that the monitoring unit is being started or restarted after a power-on reset, the timer makes it possible to detect a total loss of battery voltage, in order to distinguish between this and brief drops in voltage.

It is furthermore possible to provide for the monitoring unit to enter a sleep mode after a time interval which can be predetermined, thereby saving energy for supplying the unit. In this case, means can be provided for storing an on-board power supply system voltage value (particularly a read-only memory), and means can be provided for comparing the stored value with an approximately sensed present on-board power supply system voltage. When the on-board power supply system voltage is in a stable state, then, once the monitoring unit has been "awakened", only minor changes can occur, in principle, in the voltage, compared with the stored value.

The method according to the invention, for operating the above-mentioned device in a motor vehicle having an electrical voltage generator operated by an engine, includes in particular, the following:

a) monitoring at least one of the electrical on-board power supply system variables and/or the state of the monitoring unit during a starting phase of the monitoring unit;

b) monitoring at least one of the electrical on-board power supply system variables before starting the engine; and c) monitoring at least one of the battery state variables during an engine starting phase.

In the method, an additional step d) can now be provided by monitoring at least one of the battery state variables once the engine has been successfully started until the vehicle starts to be driven, in order to detect whether the disconnection of an external starting cable is identified. Specifically, according to the invention, after an external start has been carried out by means of an electrical starting jumper cable, the starting jumper cable is finally disconnected once again on both vehicles. In this case, the cable is never disconnected until after starting of the engine in the vehicle to which starting assistance is being given, and this implies measurable changes in the battery state variables, such as the battery voltage. After successful engine starting, the generator in the vehicle to which starting assistance is being given will supply a current, the majority of which flows into the battery. Furthermore, current can flow into the battery in the vehicle providing the starting assistance. If the starting jumper cable is now disconnected in this situation, then the measured current into the battery falls suddenly. This can be identified as disconnection of the starting jumper cable, and thus as external starting. This routine ends when the vehicle is driven off. This further monitoring step thus increases considerably the reliability of identification of external starting.

Furthermore, in addition, a switch signal from the vehicle trunk lid or the hood can be evaluated, as a plausibility factor, in order to detect whether either of them has been opened. Depending on whether the battery is arranged in the engine compartment or in the trunk, one of these sensors will indicate an "open hood or trunk lid" if the battery is accessed, for example in order to connect a starting jumper cable. Thus, so to speak, an open hood or trunk lid represents a necessary but insufficient condition for external starting to take place.

The step or steps a) is or are in this case advantageously carried out only once during the starting of the monitoring unit while, in contrast, steps b) and c) are carried out in a loop until a defined final state is reached.

The monitoring unit can be started from various states. Normally, it is either in an operating mode or in the abovementioned sleep mode. (That is, the unit is in a rest state, but reacts to changes in the vehicle state or to internal wake-up signals.) Thus, according to the invention, step a) can also be used to check whether the monitoring unit is being activated from a sleep mode or by means of a power-on reset, with a further check being carried out in the case of a power-on reset to determine whether the drop in voltage has lasted for more than a minimum period, which can be predetermined. Furthermore, it is possible to provide for a most recently measured on-board power supply system voltage and/or an on-board power supply system voltage detected cyclically by means of regular waking up from the sleep mode to be stored before the monitoring unit enters the sleep mode, and for a regularly detected present on-board power supply system voltage to be compared with the stored value.

In the situation where the battery is being charged, the charging process is ended after a certain time without the engine having been started. After this, the on-board power supply system voltage falls once again. However, the drop in voltage on its own is not sufficient to allow identification that an external energy source has been disconnected. According to the invention, it is thus possible to provide for the on-board power supply system load also to be detected and to be compared appropriately.

In one exemplary embodiment, step b) is used to check whether the on-board power supply system voltage when the engine is not running, is greater than a first threshold value that is between a battery normal voltage and a generator normal voltage, and, if so, whether an engine start will be carried out within a first time window which can be predetermined. For external starting, a connection between the two vehicle batteries is normally produced first of all, and the engine of the vehicle to which starting assistance is being given is then started, as a result of which its generator provides a voltage of about 14 V. This in turn likewise leads to the on-board power supply system voltage of the vehicle to which starting assistance is being given being increased to about 14 V, or to a voltage value between the battery normal value of about 12.5 V and the voltage of 14 V supplied by the generator. If the on-board power supply system voltage in the vehicle to which starting assistance is being given now exceeds the first threshold value mentioned when the engine in the vehicle is stationary, then an external energy source must necessarily be present.

If no engine start now takes place, all that is happening is that the battery is being charged. If the charging process is then interrupted, the on-board power supply system voltage falls once again. Thus, according to the invention, if no engine start takes place within the first time window, another check is carried out to determine whether the on-board power supply system voltage has fallen again, without the on-board power supply system load having changed.

If, however, the voltage level is below the first threshold value, then a further check is made to determine whether the on-board power supply system voltage (when the engine is not running) has increased within a second (predeterminable) time window of a few seconds (particularly about 5–10 seconds). Since a vehicle which needs to be started externally has a discharged battery, its rest voltage will be relatively low. If a second battery is now connected to this battery, the voltage is equalized, which briefly raises the voltage in the on-board power supply system to which the external start is being given.

To confirm the plausibility of the abovementioned voltage increase, an additional check can be made to determine whether the on-board power supply voltage is greater than a second threshold value. This advantageously makes it possible to avoid recovery of the battery voltage after a load, for example a starter, has been switched off being assessed as the connection of an external energy source.

According to a further exemplary embodiment, step b) is furthermore used to check whether the on-board power supply system voltage is greater than a third threshold value, with the on-board power supply system load remaining constant and without the generator supplying any power. If the load on the on-board power supply system remains unchanged, or does not increase, then it is impossible for a voltage greater than the third threshold value to occur. If a voltage greater than this threshold value is measured, without the generator supplying any current, then it must be assumed that there is an external energy supply.

A further exemplary embodiment provides that, in step c), the electrical internal resistance of the battery is detected while engine starting is taking place, in particular via a current and voltage measurement using the said sensors (possibly as a function of temperature) and is buffer-stored, and a subsequent check is carried out to determine whether the presently measured internal resistance is less than the stored value. In the process, it is also possible to check whether the present value is considerably less than during a recently carried out failed starting attempt, or whether the value is less than a predetermined value. In the electrical sense, connection of the two batteries results in the respective internal resistances of the two voltage sources being connected in parallel. In consequence, the total internal resistance of the two batteries is reduced. If a considerably reduced battery internal resistance is now identified during another starting attempt once an external energy source has been connected, without this having been identified in step b), then, according to the invention, external starting is deduced. In addition, the battery operating temperature can be detected and checked to determine whether the operating temperature is greater than the detected value.

The detected internal resistance and/or battery operating temperature in a first starting attempt can advantageously be stored, and the battery parameters of the most recent starting attempt can be used as a reference.

According to the invention, an externally caused push against a motor vehicle (for example when a motor vehicle is being towed) can be identified by monitoring the wheel rotation speed and the engine rotation speed of the motor vehicle. If a wheel rotation speed value>0 is detected when engine rotation speed value=0, it is assumed that the motor vehicle is being propelled by an external source (in particular that the motor vehicle is being towed). This identification can in this case advantageously be used as an additional monitoring step in the method mentioned above.

The invention will be explained in more detail in the following text with reference to exemplary embodiments which are illustrated in the drawings, and with the same reference symbols being used for functionally identical or similar features.

DETAILED DESCRIPTION OF THE DRAWINGS

Figure 1:
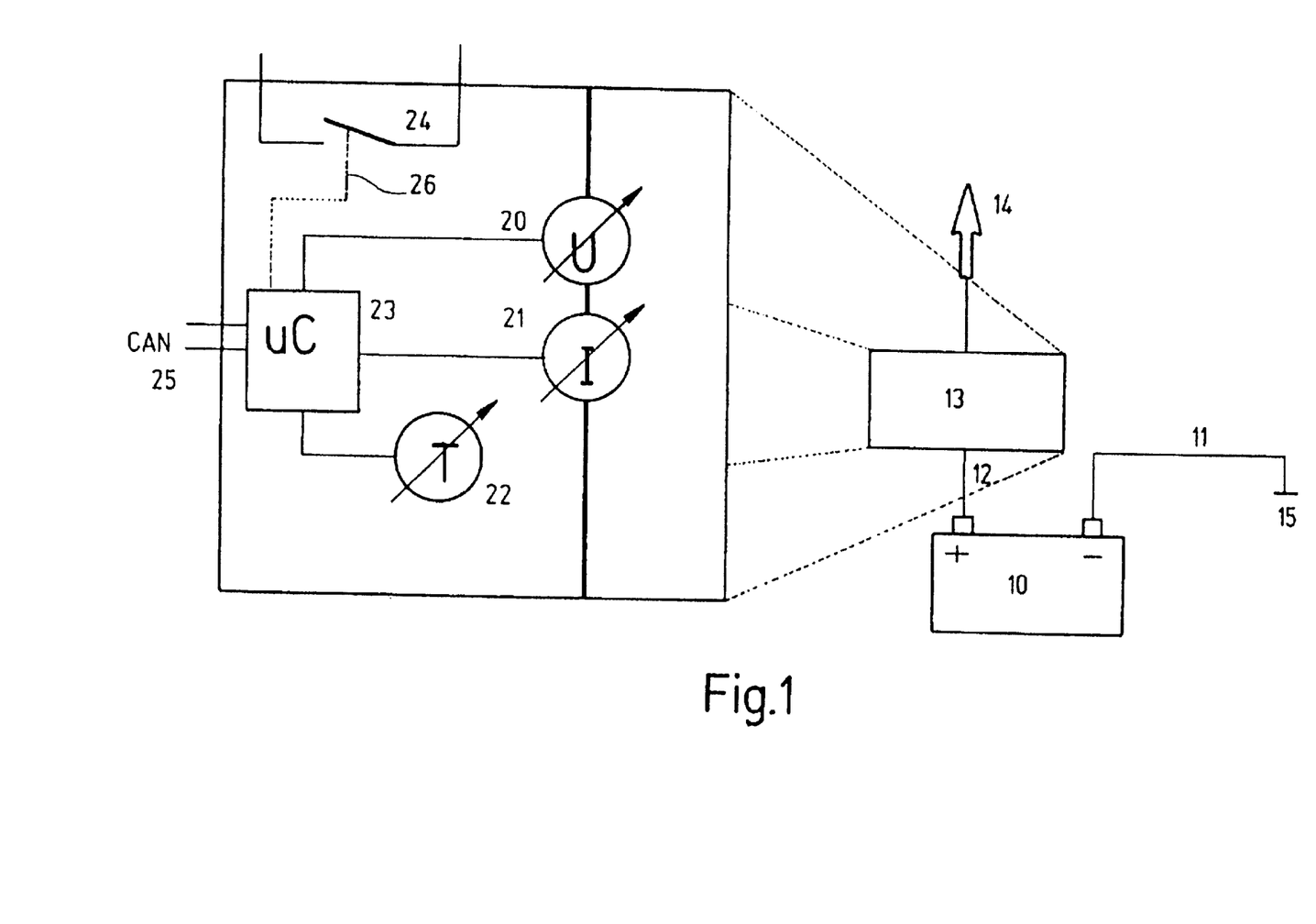
FIG. 1 shows a schematic block diagram of an identification device according to the invention.

FIG. 1 shows a device according to the invention, installed in a motor vehicle (not shown) for identification of external starting. The vehicle has an electrical on-board power supply system 14, which is fed with an on-board power supply system voltage of 12 V via a vehicle battery 10. A negative pole 11 of the battery 10 is connected to a vehicle ground 15. A monitoring unit 13 according to the invention is arranged between a positive pole 12 of the battery 10 and the on-board power supply system 14.

Sensors provided in the monitoring unit 13 include a conventional voltage sensor 20 for detection of the on-board power supply system voltage, a similarly conventional current sensor 21 for detection of the current flowing out of the battery, and a conventional temperature sensor 22 for detection of the operating temperature of the battery 10. The main measurement variable is the on-board power supply system voltage; the battery current and the battery temperature represent auxiliary measurement variables in the monitoring algorithm which will be described in more detail in the following text.

The monitoring unit 13 also contains a microcontroller 23 which, via a CAN bus 25, can identify a change in the on-board power supply system load. As is indicated by the dashed line 26, the on-board power supply system load can also be detected directly via a controllable switch 24.

Figure 2:
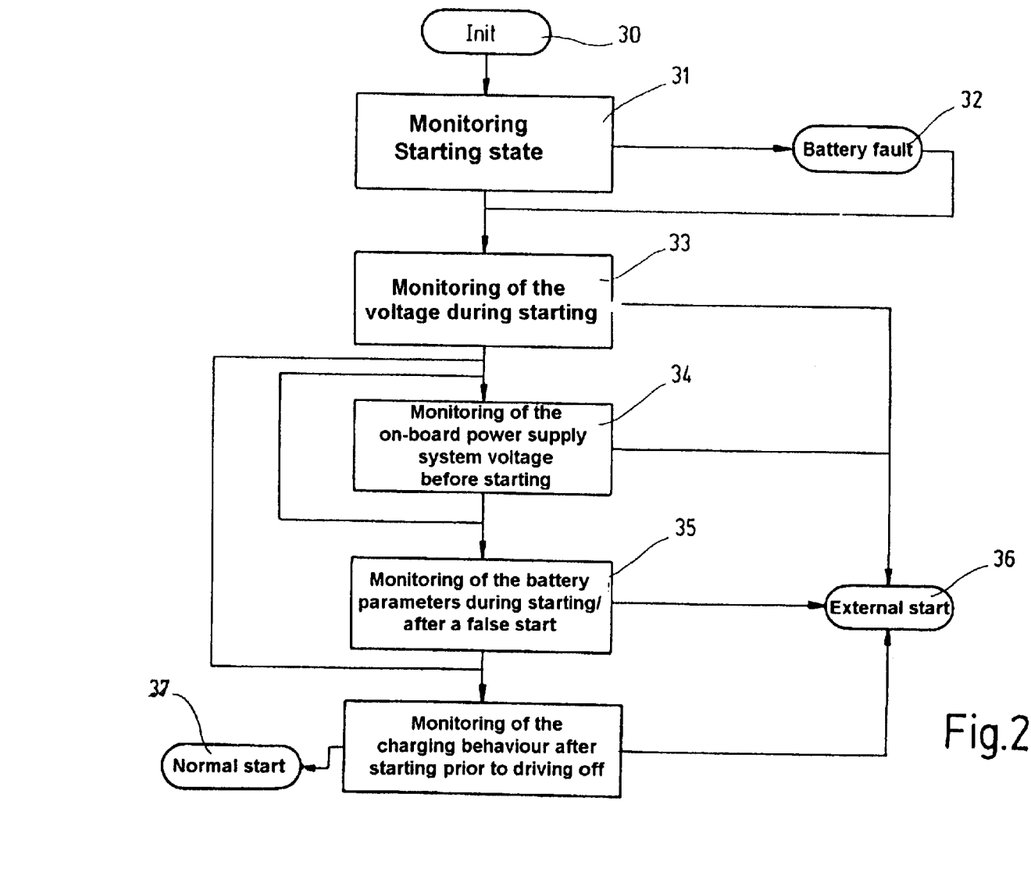
FIG. 2 shows a flow diagram that illustrates the process according to the invention for identification of external starting.

FIG. 2 shows a basic algorithm according to the invention for identification of external starting. As can be seen, the algorithm is subdivided into five operating phases (I–V). Phases I and II are carried out only once at the start of a program which includes the algorithm, while phases III and IV, on the other hand, are carried out repeatedly until a defined program final state is reached (see below).

In the first operating phase (I) 31, which follows initialization 30 of the program, a check is carried out while the monitoring unit 13 is in a starting state to determine whether the monitoring unit 13 is being started from an operating mode, from a sleep mode, or after a power-on reset. If the monitoring unit 13 is being started as a result of a power-on reset, then a total voltage loss must have occurred in the on-board power supply system. The monitoring unit thus transmits, or causes the transmission of, a "battery fault" signal 32 to the vehicle electrical system, for example via the CAN bus 25.

As a plausibility check, a timer or a corresponding program loop can also be provided, which monitors whether the time period of the voltage loss has exceeded a minimum period. If so, then a discharged battery or a battery which has been disconnected during that time period can be assumed.

In the second operating phase (II) 33, the on-board power supply system voltage is monitored for any voltage changes, also during the starting of the monitoring unit. In the third phase (III) 34, the on-board power supply system voltage is monitored until the engine is started. Finally, in the fourth phase (IV) 35, a number of battery parameters are monitored during engine starting, or, if appropriate, once a false start has taken place. The outcome of the second, third and fourth phases is either that the engine has been started externally 36 (starting assistance) or else that the engine has been started normally 37, using only the on-board power supply system's own battery.

Figure 3:
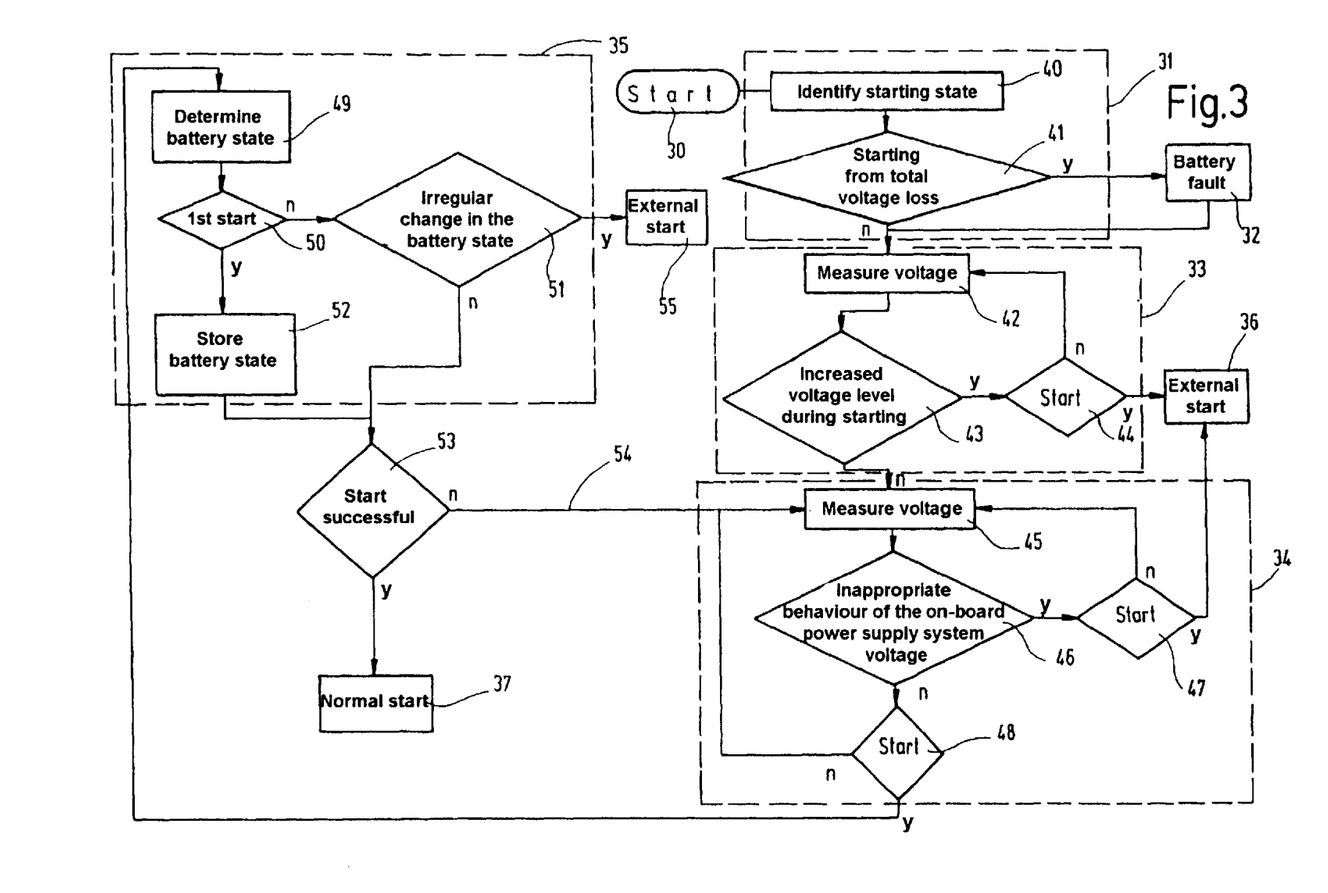
FIG. 3 is a more detailed flow diagram for the basic process shown in FIG. 2.
Figure 4A:
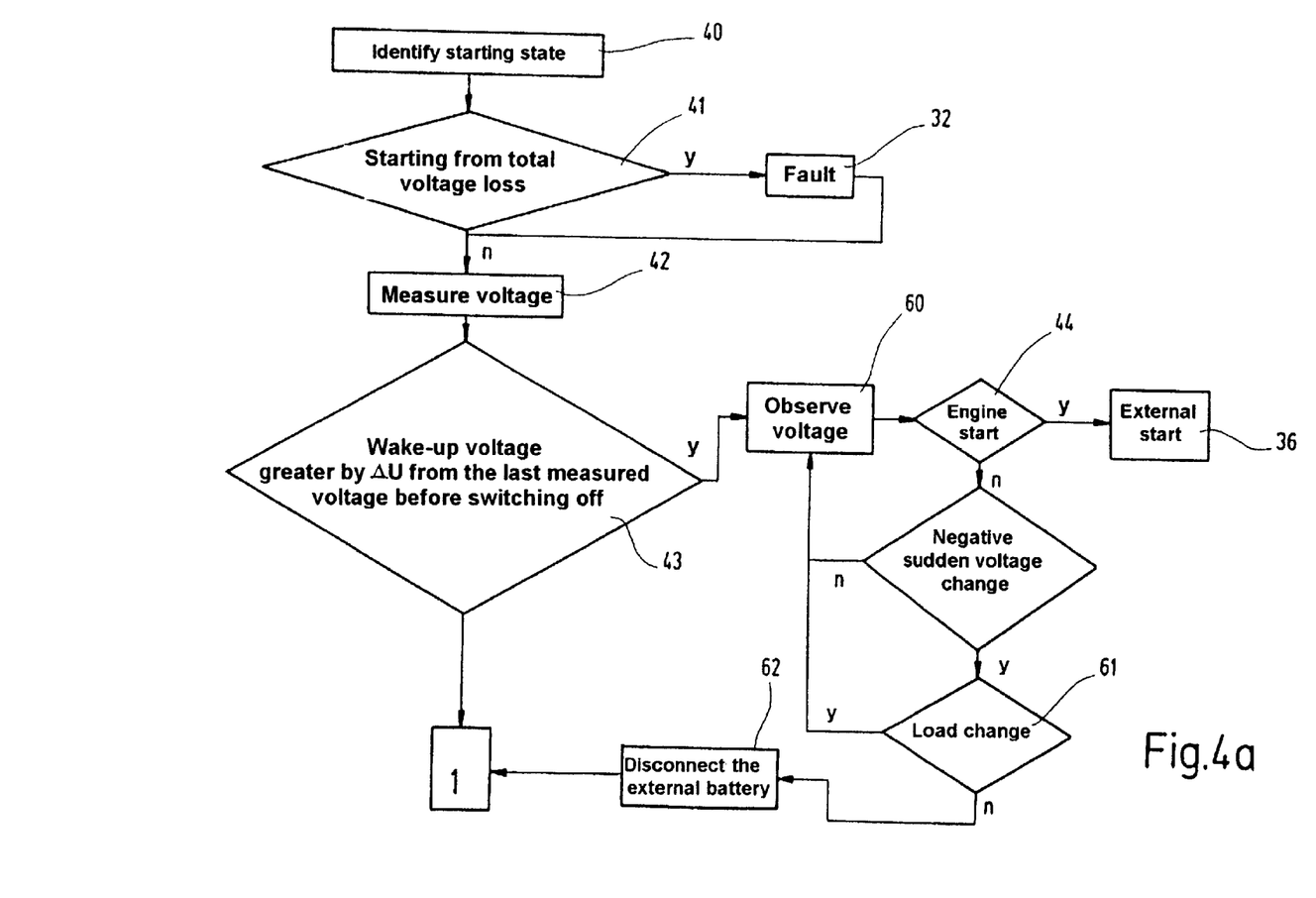
FIGS. 4a–c show three partial views of a second detailed diagram of the basic process shown in FIG. 2.
Figure 4B:
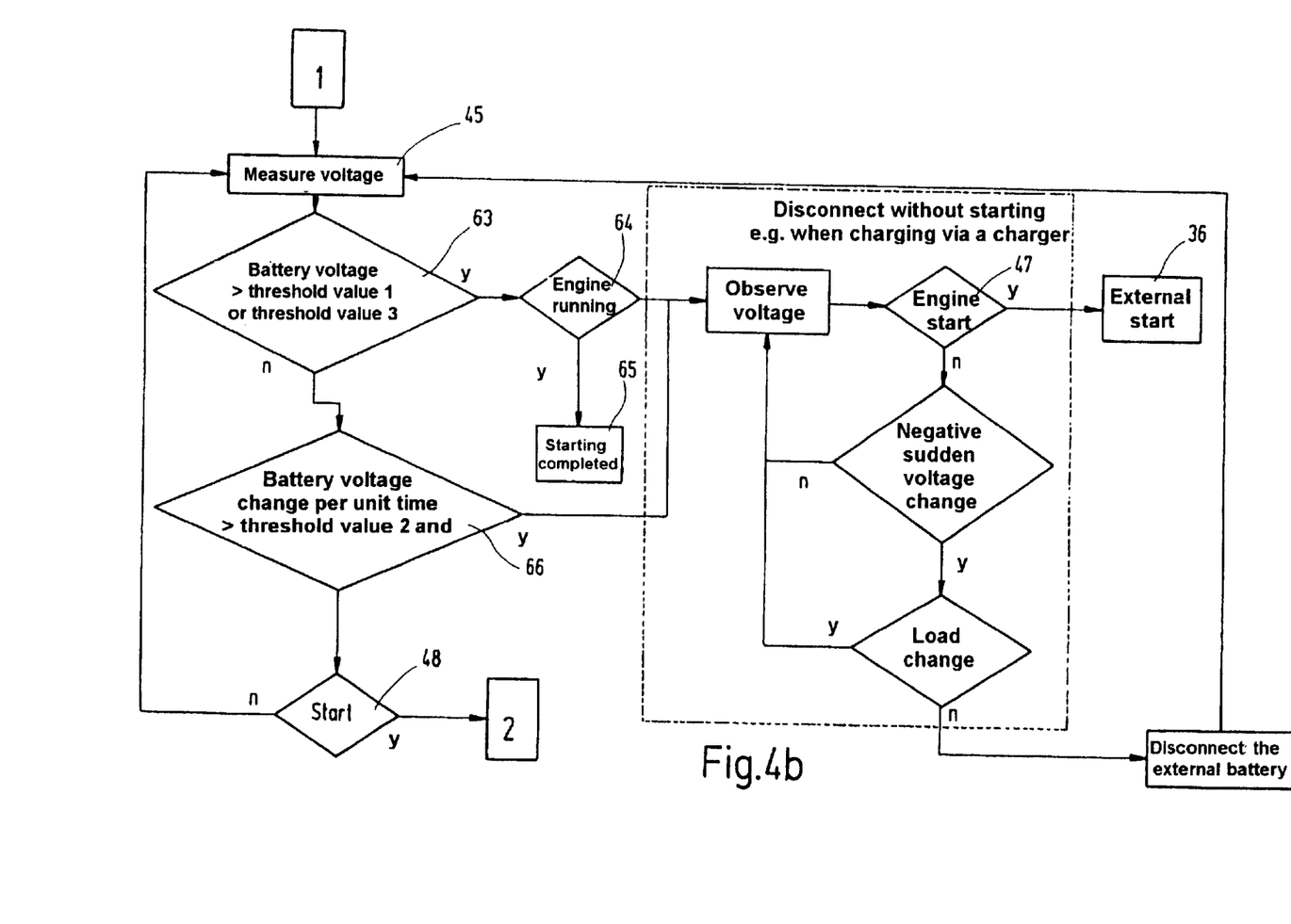
Figure 4C:
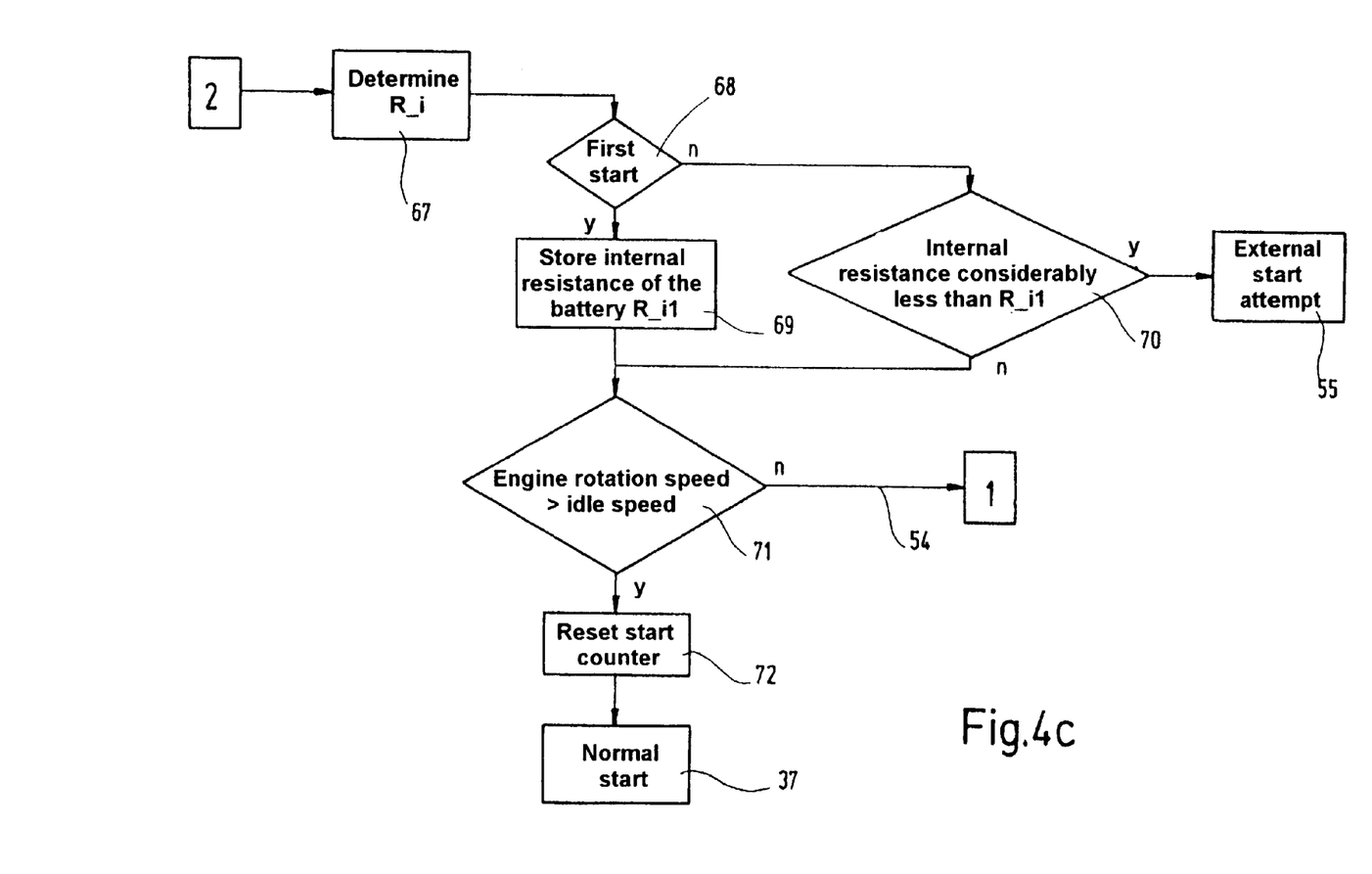

FIG. 3 shows a more detailed illustration of the basic process shown in FIG. 2. The five phases 31, 33–35 described in FIG. 2 are delineated from one another here by means of dashed lines. In addition, FIGS. 4a–c show three partial views of a further detailed illustration in the basic algorithm. In general, these partial views can be linked together to form a single flowchart, via the numbers "1" to "3" shown in squares.

First of all, as has already been explained, in FIG. 3 a check is carried out 40 to determine whether the monitoring unit 13 is in a starting state and whether this state follows a total voltage loss 41. If not, (that is, there is no battery fault 32), the on-board power supply system voltage is measured 42 during the starting of the monitoring unit 13—as the transition to phase II.

Before entering the sleep mode, the monitoring unit 13 stores the most recently measured voltage value. In addition, the on-board power supply system voltage can be measured cyclically by waking up the monitoring unit 13 regularly, with these measurements being stored in a read-only memory.

If on-board power supply system voltage is operating in a stable manner, only lower or at most equal voltage values can occur, compared with the stored value, after waking up. However, if the presently detected on-board power supply system voltage is greater 43 by an amount ΔU than the most recently measured voltage stored in the read-only memory, then this voltage must have been produced by an external voltage source. If the vehicle engine is also started 44 in this case, then external starting 36 can be assumed. However, if the engine is not started, then the battery is being externally charged.

In the situation where the battery is only being charged, then the charging process is ended at some time without the engine being started. After this, the voltage in the on-board power supply system falls once again. The drop in voltage on its own is (in this situation) not sufficient, however, to clearly identify disconnection 62 of the external voltage source. A check is thus likewise carried out 60 (FIG. 4a) to determine whether the load on the on-board power supply system load, has changed 61 at the same time. To this end, the monitoring unit 13 can also use the current sensor 21 to check for any change in the current flowing into the on-board power supply system. Changes in the load state can also be indicated to the monitoring unit 13 via the CAN bus 25, or a switching signal produced by the switch 24 is used as an identification signal.

The operating phases III and IV will now be described in detail with reference to FIGS. 3 and 4a–c.

Phase III: Monitoring of the On-Board Power Supply System Voltage Before Engine Starting If external starting is carried out normally, then a connection is first made between the two vehicle batteries, after which the engine of the vehicle providing the starting assistance is started so that its generator can raise the voltage level to about 14 V. As a result, the on-board power supply system voltage in the vehicle to which starting assistance is being given also rises to about 14 V. Thus, the on-board power supply system voltage is measured 45 first of all in phase III. If the on-board power supply system voltage in the vehicle to which starting assistance is being given now exceeds 46 a first threshold value 63 when the engine is stationary 64, then an external energy source must necessarily be present. If the engine is now started 47 with an external energy source connected (which can be identified, for example, via a corresponding signal on the CAN bus), then this is assessed as external starting 36. If no start is carried out, then it is assumed that the battery is just being externally charged.

In the situation where the battery is being charged, this process will end at some time without the engine being started. The on-board power supply system voltage then falls once again. However, the drop in voltage alone is not sufficient to allow confident identification that the external energy source has been disconnected. The process according to the invention thus also takes account of whether the load on the on-board power supply system has changed at the same time. To this end, the monitoring unit 13 can use the current sensor 21 to monitor for any change in the current flowing into the on-board power supply system, and/or to signal changes in the load state, via the CAN bus 25. Alternatively, the switching of the internal switch 24 can be assessed as a corresponding signal.

If the load on the on-board power supply system does not change, or does not increase, then it is impossible for any voltage greater than $U_{init}$ (threshold value 3) to occur 63. However, if a voltage greater than $U_{init}$ is measured without the generator supplying any current, then an external energy supply must be assumed.

If a failed start of the engine has already taken place 65, then the present on-board power supply system voltage can also be compared with a voltage $U_{30\ before\ first\ failed\ start}$. If the voltage before one of the next starts is greater than the voltage $U_{30\ before\ first\ failed\ start}$, then an external supply can be assumed, but only if the load in the on-board power supply system has likewise not been reduced. The change in load is in this case determined as above.

If the voltage level is below the first threshold value, then a further monitoring routine becomes active. Since a vehicle which needs to be started externally must have a discharged battery, its rest voltage will be relatively low. If a second battery is now connected to this battery, then an electrical equalization process takes place, in particular voltage equalization, between these two batteries. This results in a rise in the voltage in the on-board power supply system to which external starting assistance is being given. The voltage equalization in this case normally follows an exponential time response, and this voltage increase is thus generally completed in a very short time period of only a few seconds. If a sudden increase in the on-board power supply system voltage is now identified 66 within a predetermined time window, while the engine is not running, then it must be assumed that an external energy source has been connected. As a plausibility check for this voltage increase, a check is also carried out, according to the invention, to determine whether the voltage level is also greater than a second threshold value. This makes it possible to prevent any misinterpretation of a recovery in the battery voltage after a load (for example a starter) has been switched off, as the connection of an external energy source.

All of the above conditions are checked until engine starting is identified, 48.

Phase IV: Monitoring of the Battery Parameters during Engine Starting

The internal resistance of the battery is determined 49, 67 during engine starting 50 via a current and voltage measurement using the sensors 20 and 21. In addition, the battery temperature can be measured by means of the temperature sensor 22. If this is a first starting attempt 68, then these parameters are stored 52, 69.

In the equivalent circuit, the connection of the two batteries corresponds to the respective internal resistances of the two sources being connected in parallel. The total internal resistance of the battery arrangement is thus reduced. If, after an external energy source has been connected but has not been detected in phase III, another starting attempt 50 is now made, this will result in a considerably lower internal battery resistance being identified 51, 70, and external starting 55 is deduced. As an alternative to this, the battery parameters from the last starting attempt can also be used as a reference.

If the engine fails to start, the process jumps back 54 to phase III. If the starting process is carried out successfully 71 without any fault having been identified, the process or program is ended 37, and a start counter is reset 72. Otherwise, in the case of a failed start, the on-board power supply system voltage $U_{30\ before\ first\ failed\ start}$, is stored before the first start was carried out.

The operating states in each case identified by the proposed algorithm can be signaled, for example, via the CAN bus to the respective safety-relevant loads in the vehicle.

In addition, for plausibility checking purposes, it is possible for a switch signal from the trunk lid or the hood to be evaluated to determine whether the battery is arranged in the engine compartment or in the trunk. This is because access to the battery (for example to connect a starting jump cable) necessarily means that the trunk lid or hood has been opened in advance.

In addition to the described identification of starting assistance, the process and apparatus according to the invention also facilitates detection of towing or pushing against a motor vehicle with a gear selection system to be identified. In this case, the wheel rotation speed and the engine rotation speed are monitored, and if a wheel rotation speed value >0 is detected when the engine is at the same time stationary (engine rotation speed=0), then external towing or pushing is assumed.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for detecting presence of an external power supply connected to a motor vehicle which has an electrical on-board power supply system and a battery, for providing an on-board power supply system voltage, said device comprising:
   a monitoring unit arranged between the battery and the on-board power supply system;
   said monitoring unit having at least one sensor for detection of an on-board power supply system voltage; and
   said monitoring unit also having a computer for automatically identifying changes in the on-board power supply system voltage and determining presence of an external power supply connected to the vehicle, based on said changes.

2. The device according to claim 1, wherein the monitoring unit has or interacts with at least one further sensor for detecting an on-board power supply current flowing out of the battery or into the on-board power supply system.

3. The device according to claim 2, wherein the monitoring unit includes means for identifying changes in the on-board power supply system load, based on the on-board power supply system voltage and the on-board power supply system current.

4. The device according to claim 1, wherein the monitoring unit has or interacts with a sensor for detecting an operating temperature of the battery.

5. The device according to claim 3, wherein:
   the computer comprises a microcontroller; and
   the computer automatically determines changes in electrical on-board power supply system variables.

6. The device according to claim 5, further comprising a controllable switch for actively changing the on-board power supply system load, which switch interacts with the microcontroller.

7. The device according to claim 5, wherein:
   the microcontroller is connected to a CAN bus for data transmission in the vehicle; and
   any change in the on-board power supply system load is identified by means of data provided via the CAN bus.

8. The device according to claim 1, further comprising a timer for detection of time duration of any drop in voltage in the on-board power supply system voltage.

9. The device according to claim 1, wherein said computer comprises:
   means for storage of a value of at least one of the on-board power supply system voltage and the on-board power supply system load; and
   means for comparing the stored value with one of a sensed present on-board power supply system voltage or on-board power supply system load, and for determining presence of said external power supply based on a result of said comparison.

10. A method of operating a device for detecting presence of an external power supply connected to a motor vehicle which has an engine with an electrical voltage generator operated by the engine and an electrical on-board power supply system with a battery, for providing an on-board power supply system voltage, said device comprising a monitoring unit arranged between the battery and the on-board power supply system; said monitoring unit having at least one sensor for detection of an on-board power supply system voltage; and said monitoring unit also having a computer for automatically identifying changes in the on-board power supply system voltage and determining presence of an external power supply connected to the vehicle; said method comprising:
   monitoring at least one of electrical on-board power supply system variables and a state of the monitoring unit during a starting phase of the monitoring unit;
   monitoring at least one of electrical on-board power supply system variables before starting the engine;
   monitoring of at least one of the battery state variables during an engine starting phase; and
   said computer detecting connection of an external power supply based on an analysis of said monitored variables.

11. The method according to claim 10, further comprising: monitoring at least one battery state variable after an engine start, until the vehicle starts to be driven.

12. The method according to claim 10, wherein:
   the first monitoring step is performed only once during starting of the monitoring unit; and
   the second and third monitoring steps are performed repeatedly until a defined final state is reached.

13. The method according to claim 10, wherein:
   the first monitoring step checks whether the monitoring unit is activated from a sleep mode or from a power-on-reset mode; and
   in the event of a power-on-reset mode, a further check is made whether a presettable minimum voltage drop duration has been exceeded.

14. The method according to claim 10, wherein:
   before the monitoring unit enters a sleep mode, one of a most recently measured on-board power supply system voltage and an on-board power supply system voltage detected cyclically by means of regular waking up from the sleep mode, is stored; and
   a regularly detected present on-board power supply system voltage is compared with the stored value.

15. The method according to claim 14, wherein the on-board power supply system load is also detected and is compared to a corresponding value.

16. The method according to claim 10, wherein:
   the second monitoring step checks whether the on-board power supply system voltage, when the engine is not running, is greater than a first threshold value which is between a battery normal voltage and a generator normal voltage; and
   if so, a further check is made whether an engine start will be carried out within a first time window which can be predetermined.

17. The method according to claim 16, wherein, if no engine start takes place within a first time window, a further check is made to determine whether the on-board power supply system voltage has fallen again, without the on-board power supply system load having changed.

18. The method according to claim 16, wherein if the on-board power supply system voltage does not exceed the first threshold value, another check is carried out to determine whether the on-board power supply system voltage, when the engine is not running, has increased within a second predeterminable time window which is between approximately five and ten seconds.

19. The method according to claim 18, wherein a further check is made to determine whether the on-board power supply system voltage is greater than a second threshold value.

20. The method according to claim 10, wherein the second monitoring step checks whether the on-board power supply system voltage is greater than a third threshold value, with the on-board power supply system load remaining constant and without the generator supplying any power.

21. The method according to claim 10, wherein:
in the third monitoring step, electrical internal resistance of the battery is detected and stored during an engine start that has been carried out; and
a check is then made to determine whether a presently measured value of the internal resistance is less than the stored value.

22. The method according to claim 10, wherein:
in the third monitoring step, operating temperature of the battery is also detected; and
a comparison is made to determine whether the operating temperature is greater than a specified value.

23. The method according to claim 22, wherein at least one of a detected internal resistance and detected operating temperature of the battery is stored in the event of a first starting attempt.

24. The method according to claim 23, wherein battery parameters of a most recent starting attempt are used as a reference for comparison.

25. The method according to claim 10, wherein a switch signal from one of a vehicle trunk lid and a hood of the vehicle is evaluated to establish whether they are open.

26. The method for identification of an externally caused push against a motor vehicle, as an additional monitoring step in a method according to claim 10, wherein
at least one wheel rotation speed and engine rotation speed of the motor vehicle are monitored; and
if a wheel rotation speed value >0 is detected and an engine rotation speed value=0 is detected at the same time, it is concluded that the motor vehicle is being pushed by an external source, in particular that the motor vehicle is being towed.

* * * * *